(12) United States Patent
Tibbott et al.

(10) Patent No.: US 8,943,791 B2
(45) Date of Patent: Feb. 3, 2015

(54) DIRT PARTICLE SEPARATOR DEVICE FOR USE IN A GAS TURBINE ENGINE

(75) Inventors: Ian Tibbott, Lichfield (GB); Dougal Jackson, Derby (GB)

(73) Assignee: Rolls-Royce PLC, London (GB)

( * ) Notice: Subject to any disclaimer, the term of this patent is extended or adjusted under 35 U.S.C. 154(b) by 1081 days.

(21) Appl. No.: 12/876,576

(22) Filed: Sep. 7, 2010

(65) Prior Publication Data
US 2011/0067378 A1 Mar. 24, 2011

(30) Foreign Application Priority Data

Sep. 21, 2009 (GB) .................................... 0916432.8

(51) Int. Cl.
F02G 3/00 (2006.01)
F01D 25/32 (2006.01)
B01D 46/00 (2006.01)
F02C 7/18 (2006.01)
(Continued)

(52) U.S. Cl.
CPC ............ *F01D 25/32* (2013.01); *B01D 46/0039* (2013.01); *F02C 7/18* (2013.01); *F01D 9/065* (2013.01); *F05D 2260/607* (2013.01); *Y02T 50/67* (2013.01); *Y02T 50/671* (2013.01); *Y02T 50/675* (2013.01); *F05D 2240/81* (2013.01); *F05D 2250/184* (2013.01); *F05D 2260/202* (2013.01); *F05D 2250/181* (2013.01); *B01D 45/04* (2013.01)
USPC ..................... 60/39.091; 60/39.092; 415/115; 415/144; 416/95; 416/96 R; 416/97 R

(58) Field of Classification Search
CPC .................................. F02G 3/00; B01D 50/00
USPC ............... 60/39.091, 39.092; 415/121.2, 144, 415/115; 416/95, 96 R, 97 R
See application file for complete search history.

(56) References Cited

U.S. PATENT DOCUMENTS 2,387,080 A * 10/1945 Lundberg et al. ................ 96/335
2,632,626 A * 3/1953 McClintock ................ 416/97 R
(Continued)

FOREIGN PATENT DOCUMENTS

| EP | 0 690 202 A3 | 1/1996 |
| EP | 1 760 260 A2 | 3/2007 |
| EP | 1 832 734 A2 | 9/2007 |

OTHER PUBLICATIONS

Definition of scoop, Merriam Webster's Collegiate Dictionary 10th Edition 1996, p. 2.*
(Continued)

*Primary Examiner* — William H Rodriguez
*Assistant Examiner* — Rene Ford
(74) *Attorney, Agent, or Firm* — Oliff PLC

(57) ABSTRACT

A separator device is provided for separating dirt particles from a flow of cooling air fed to airfoils of the turbine section of a gas turbine engine. In use the separator device extends across a conduit which bypasses the combustor of the engine to convey pressurized cooling air carrying dirt particles from the compressor section of the engine to openings which direct the air into the airfoils. The separator device is configured to direct a first portion of the impinging cooling air flow away from the openings and to allow a second portion of the impinging cooling air to continue to the openings. The first portion of cooling air has a higher concentration of the coarsest dirt particles carried by the cooling air than the second portion of cooling air.

14 Claims, 4 Drawing Sheets

(51) Int. Cl.
  *F01D 9/06*   (2006.01)
  *B01D 45/04*  (2006.01)

(56) References Cited

U.S. PATENT DOCUMENTS

| | | | | |
|---|---|---|---|---|
| 2,808,089 | A | * | 10/1957 | Gerardin ................... 241/46.017 |
| 3,329,377 | A | * | 7/1967 | Peterson et al. ............ 244/53 B |
| 3,673,771 | A | * | 7/1972 | Dickey ........................... 55/306 |
| 3,778,983 | A | * | 12/1973 | Rygg .............................. 55/306 |
| 3,952,972 | A | * | 4/1976 | Tedstone et al. ............ 244/53 B |
| 4,346,860 | A | * | 8/1982 | Tedstone ..................... 244/53 B |
| 4,820,123 | A | * | 4/1989 | Hall ............................ 416/97 R |
| 6,077,034 | A | * | 6/2000 | Tomita et al. ................. 415/110 |
| 6,308,511 | B1 | | 10/2001 | Beeck et al. |
| 6,413,044 | B1 | * | 7/2002 | Roeloffs et al. ............ 415/169.1 |
| 6,659,714 | B1 | * | 12/2003 | Tiemann ....................... 415/115 |
| 6,866,693 | B2 | * | 3/2005 | Igarashi ...................... 55/385.3 |
| 7,137,777 | B2 | * | 11/2006 | Fried et al. .................... 415/115 |
| 7,147,684 | B2 | * | 12/2006 | Anderson et al. ............ 55/385.1 |
| 7,284,953 | B2 | * | 10/2007 | Silverman et al. .......... 415/121.2 |
| 7,326,031 | B2 | * | 2/2008 | O'Neill et al. ............. 415/121.2 |
| 8,240,121 | B2 | * | 8/2012 | Hazzard et al. ............ 60/39.092 |
| 2004/0221720 | A1 | | 11/2004 | Anderson et al. |
| 2005/0002778 | A1 | | 1/2005 | Fried et al. |
| 2007/0231123 | A1 | * | 10/2007 | Dervaux et al. ............... 415/115 |
| 2010/0124485 | A1 | * | 5/2010 | Tibbott ......................... 415/115 |
| 2011/0067378 | A1 | * | 3/2011 | Tibbott et al. ............. 60/39.091 |

OTHER PUBLICATIONS

British Search Report issued in British Application No. GB0916432.8 on Jan. 12, 2010.

Search Report dated Jul. 15, 2014 issued in European Patent Application No. EP 10 17 5388.

* cited by examiner

DIRT PARTICLE SEPARATOR DEVICE FOR USE IN A GAS TURBINE ENGINE

FIELD OF THE INVENTION

The present invention relates to a separator device for separating dirt particles from a flow of cooling air fed to airfoils of the turbine section of a gas turbine engine.

BACKGROUND OF THE INVENTION

The performance of gas turbine engines, whether measured in terms of efficiency or specific output, is improved by increasing the turbine gas temperature. In modern engines, the high pressure (HP) working gas temperatures are hotter than the melting point of the material of the blades and vanes, necessitating internal air cooling of these airfoil components. During its passage through the engine, the mean temperature of the gas stream decreases as power is extracted. Nonetheless, in some engines, the intermediate pressure (IP) and low pressure (LP) turbines are also internally cooled.

FIG. 1 shows an isometric view of a typical HP stage of a cooled turbine. Cooling air flows are indicated by arrows.

HP turbine nozzle guide vanes 1 (NGVs) consume the greatest amount of cooling air on high temperature engines. HP blades 2 typically use about half of the NGV flow. The IP and LP stages downstream of the HP turbine use progressively less cooling air.

The HP turbine airfoils are cooled by using high pressure air from the compressor that has by-passed the combustor and is therefore relatively cool compared to the working gas temperature. Typical cooling air temperatures are between 800 and 1000 K, while working gas temperatures can be in excess of 2100 K. Cooling air is carried along internal conduits within the airfoils and exits through a large number of cooling holes formed in the surfaces of the airfoils.

The cooling air bled from the compressor that is used to cool the hot turbine components is not used fully to extract work from the turbine. Therefore, as extracting coolant flow has an adverse effect on the engine operating efficiency, it is important to minimise the use of cooling air and maximise its effectiveness.

HP turbine NGVs are cooled using a combination of internal convection and external film cooling to protect the metal from overheating and oxidation attack. The film cooling air is bled onto the gas washed surfaces of the aerofoil through numerous rows of relatively small diameter cooling holes. These small holes are susceptible to blockage from the inside, by air-borne dirt particles or from compressor rub-seal material. In addition the holes can become blocked from the outside, by dirt particles and combustion products, that attach themselves to the gas washed surfaces of the NGV, particularly the leading edge and pressure surfaces.

Engines on aircraft that operate out of or over sandy areas such as desert are particularly susceptible to sand ingestion and cooling hole blockage.

Partially blocked film cooling holes substantially reduce the quantity of cooling air passed by the cooling system, which causes the NGV to overheat, loss of the NGV thermal barrier coating (TBC), and ultimately premature low cycle fatigue cracking and oxidation of the gas washed surfaces of the NGV. Eventually the NGVs will burn away, particularly at the leading and trailing edges, causing the turbine performance to deteriorate and early component failure.

By fan shaping the cooling holes at their downstream ends the holes become less susceptible to external blockage. However, the holes still remain prone to internal blockage. For example, the film cooling holes in the NGVs are normally produced by a laser drilling process in which the metal of the NGV is vaporised to create the holes. When a drilled hole breaks through to the internal cavity of an NGV, a rough ring of solidified metal remains, and this rough edge tends to catch the dirt particles and a build-up occurs restricting the entrance to the hole.

Air-born dirt and contaminants tend to be in greatest concentration towards the outer walls of the flow chamber that contains the combustor flame tube. This is due to the centrifugal swirl that exists at the exit of the HP compressor. Thus the cooling air that is supplied to the NGV cooling scheme from the radially outer combustor bypass annulus generally contains a higher concentration of dirt, dust and contaminants compared with the radially inner combustor bypass annulus. It follows that an option for cooling scheme locations that may be particularly susceptible to dirt blockage is to have their cooling air sourced from the inner annulus. However, sourcing large quantities of coolant from the in-board feed results in higher cooling air flow velocities, which reduces the static pressure of the cooling air and necessitates higher feed pressure delivery from the compressor in order to meet the backflow pressure margin to prevent hot gas ingestion. Further, increasing the pressure drop across the combustor has an adverse affect on turbine efficiency and specific fuel consumption.

Another option is to increase the diameter of the film cooling holes. However, this increases the quantity of cooling air required by the holes and therefore reduces the turbine efficiency of the component.

Although NGVs can be particularly susceptible to cooling hole blockage, other aerofoils (rotor blades or static vanes) with similar cooling holes in the turbine section of a gas turbine engine can also experience cooling hole blockage.

SUMMARY OF THE INVENTION

Thus a first aspect of the invention provides a separator device for separating dirt particles from a flow of cooling air fed to airfoils of the turbine section of a gas turbine engine, the separator device extending, in use, across a conduit which bypasses the combustor of the engine to convey pressurised cooling air carrying dirt particles from the compressor section of the engine to openings which direct the air into the airfoils, wherein the separator device is configured to direct a first portion of the impinging cooling air flow away from the openings and to allow a second portion of the impinging cooling air to continue to the openings, the first portion of cooling air having a higher concentration of the coarsest dirt particles carried by the cooling air than the second portion of cooling air.

Advantageously, the separator device provides a means for filtering out dirt particles from cooling air before it enters the cooling scheme of an airfoil. This can reduce the incidence of airfoil cooling hole blockage. It also allows vanes to be fed with a greater proportion of cooling air from a radially outer combustor bypass conduit, which can reduce the demand on a radially inner combustor bypass conduit, and allow the compressor to operate at a lower feed pressure delivery.

The separator device may have any one or, to the extent that they are compatible, any combination of the following optional features.

The airfoils can be rotor blades or static vanes. Typically, the airfoils are NGVs.

Typically, the conduit forms an annulus and the separator device is correspondingly ring-shaped to extend across the conduit.

The separator device may have a plurality of through-holes through which the second portion of the cooling air passes to continue to the openings.

For example, the through-holes can be sized to prevent or restrict the passage therethrough of the coarsest dirt particles. Additionally or alternatively, the through-holes may be preferentially located at radially inner regions of the conduit where the number of impinging coarser dirt particles is generally lower due to their concentration under centrifugal force in radially outer regions of the conduit.

The through-holes may be formed as slots extending substantially in the radial direction of the engine. This arrangement can allow a sufficient flow of cooling air to pass through the slots to form the second portion of the cooling air. Slots may also be less susceptible to blockage than e.g. circular holes.

The slots may narrow in width with increasing radial distance. As the larger dirt particles will tend to concentrate in radially outer regions of the conduit, narrowing the slots in this way encourages a greater proportion of the second portion of the cooling air to derive from cooling air impinging on the separator device at radially inner regions of the conduit. Additionally or alternatively, the slots may terminate at or before the radial midpoint of the conduit.

The separator device preferably has an impingement surface for the cooling air which is shaped to direct the first portion of the cooling air flow away from the openings. The through-holes referred to above can be formed in the impingement surface.

For example, the impingement surface may be shaped, e.g. curved, to turn the first portion of the cooling air along a radial direction of the engine. Typically, the cooling air is turned radially towards the working gas annulus, where it can be used for other cooling purposes.

The impingement surface may form a series of generally radially extending, circumferentially spaced, ridges. The folds between the ridges can channel air flow and coarser particles into the first portion of cooling air and away from, for example, the through-holes. The height of the ridges preferably increases towards the radial centre of the conduit. In a separator device having a plurality of through-holes through which the second portion of the cooling air passes to continue to the openings, the through-holes are preferably located on the tops of the ridges which are distanced from air and coarser particles being channeled into the first portion of cooling air.

The separator device may be formed out of sheet material. This can help to reduce the weight of the device, and allows it to be formed by e.g. a simple stamping or pressing operation.

Preferably, the separator device directs the first portion of the cooling air towards discharge nozzles which feed the first portion of the cooling air into the working gas annulus upstream of the airfoils. In particular, when the impingement surface is shaped to turn the first portion of the cooling air along a radial direction towards the working gas annulus, the first portion of the cooling air can enter the working gas annulus at a velocity with causes the coarse dirt particles to penetrate the streamlines of the working gas. The dirt may then tend to travel around the suction surface of the airfoils with the relatively dense cooling air, cooling holes on the early suction side of airfoils generally being less susceptible to cooling hole blockage from dirt ingress.

Alternatively, however, when the airfoils are NGVs, the separator device can direct the first portion of the cooling air towards discharge nozzles at the HP turbine blade shroud segments.

Typically, the separator device is located in a conduit which is radially outwards of the working gas annulus, as this is where the concentration of dirt particles tends to be highest. However, the separator device could equally be in a conduit which is radially inwards of the working gas annulus. This might be desirable in respect of engines which are operating in particularly dusty conditions, or for feeding the cooling air to rotor blades.

Preferably, the separator device is formed from a plurality of separator sub-portions, each sub-portion occupying a respective sector of the (typically annular) conduit. Forming the device from sub-portions can facilitate manufacture, installation and maintenance. Preferably, the sub-portions are modular so that they can be used interchangeably in different sectors of the conduit. Indeed, a second aspect of the invention provides a sub-portion of the separator device of the first aspect. Any one or, to the extent that they are compatible, any combination of the optional features of the separator device of the first aspect are also applicable to the sub-portion.

A third aspect of the invention provides a gas turbine engine having a separator device of the first aspect extending across a conduit which bypasses the combustor of the engine to convey pressurised cooling air containing dirt particles from the compressor section of the engine to openings which direct the air into airfoils (e.g. nozzle guide vanes) of the turbine section of the engine. Any one or, to the extent that they are compatible, any combination of the optional features of the separator device of the first aspect are also applicable to the separator device of the engine.

BRIEF DESCRIPTION OF THE DRAWINGS

Embodiments of the invention will now be described by way of example with reference to the accompanying drawings in which.

DETAILED DESCRIPTION

Figure 1:
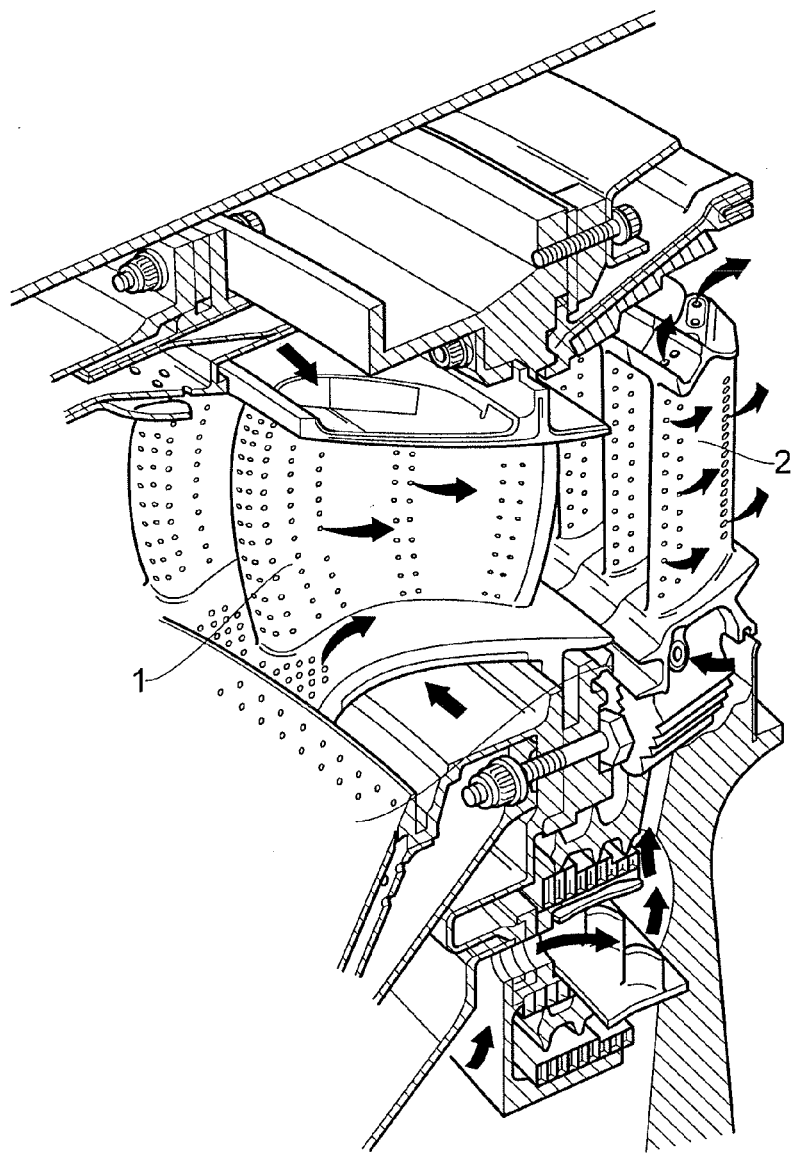
FIG. 1 shows an isometric view of a typical HP stage of a cooled turbine.
Figure 2:
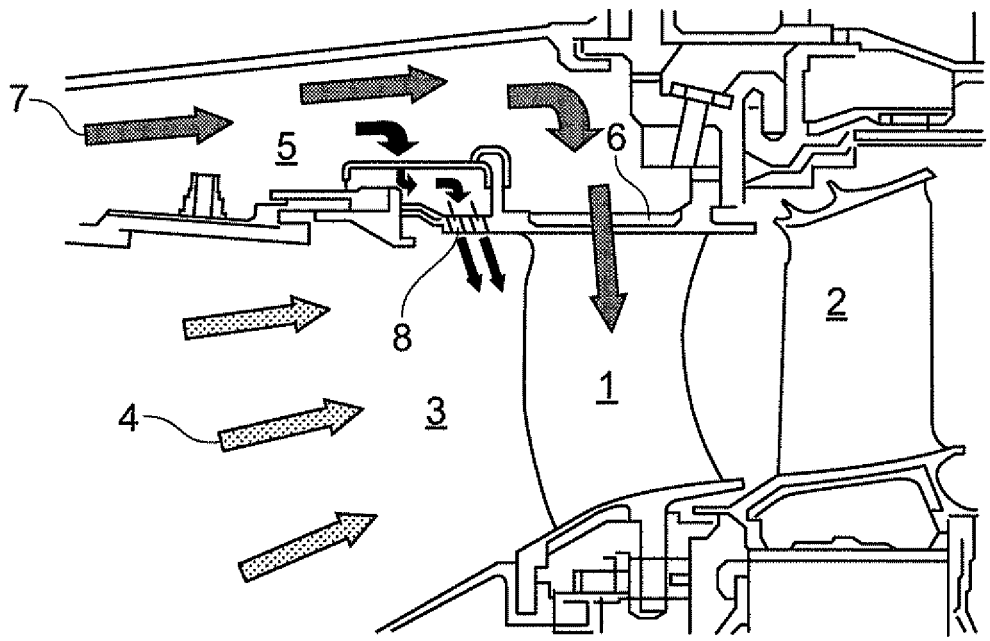
FIG. 2 shows a longitudinal cross-sectional view through an HP turbine of a gas turbine engine.

FIG. 2 shows a longitudinal cross-sectional view through an HP turbine of a gas turbine engine. An NGV 1 and a turbine blade 2 extend across the working gas annulus 3. Arrows 4 indicate the general flow direction of the working gas. A radially outer annular conduit 5 bypasses the combustor to carry pressurised cooling air from the compressor to a radially outer feed opening 6 into the interior of the NGV. The general flow direction of the cooling air is indicated by arrows 7. Some of the cooling air, instead of reaching the opening, passes through radially outer discharge nozzles 8 which feed cooling air into the working gas annulus upstream of the NGV to dilute the hot working gas adjacent to the gas path endwalls. Dirty contaminated air mainly passes into the NGV rather than through the discharge nozzles and can lead to internal blockage of film cooling holes which extend from the interior to the exterior of the NGV.

Figure 3:
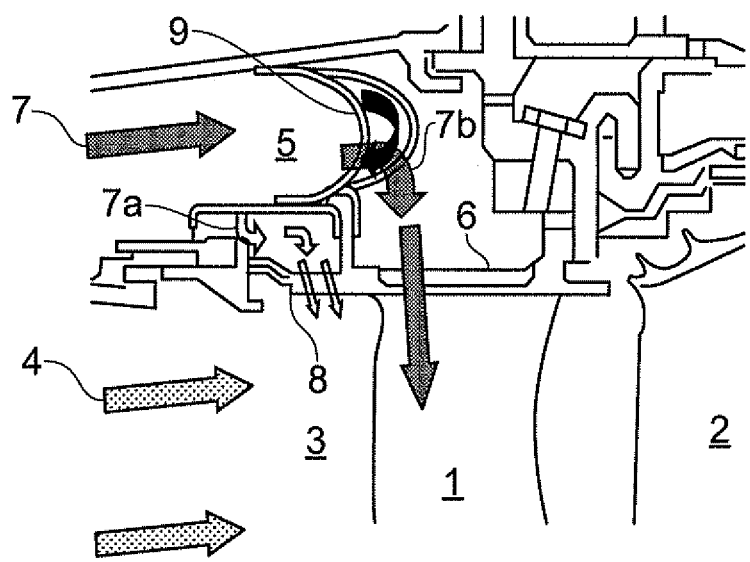
FIG. 3 shows a longitudinal cross-sectional view through the conventional HP turbine of FIG. 2, an annular radially outer bypass conduit of the engine being fitted with a separator device according to an embodiment of the present invention.
Figure 4A:
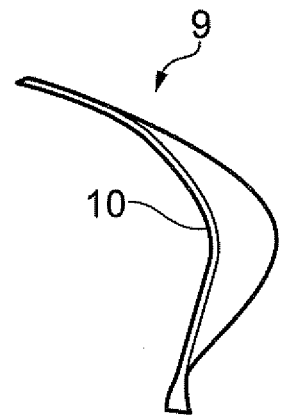
FIG. 4 shows (a) a longitudinal cross-sectional view of the separator device of FIG. 3, (b) an isometric view from the rear of a portion of the device, and (c) an isometric view from the front of a portion of the device.
Figure 4B:
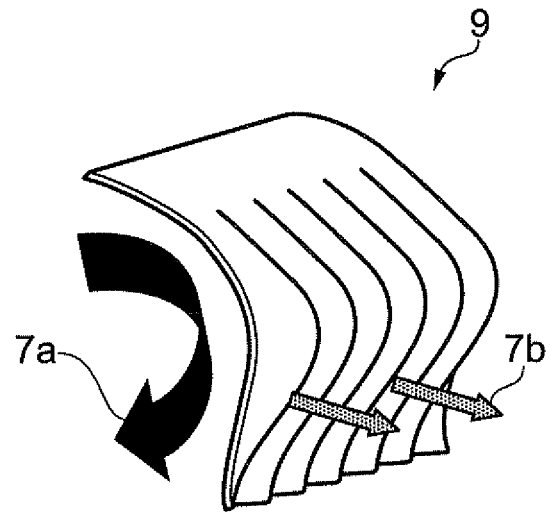
Figure 4C:
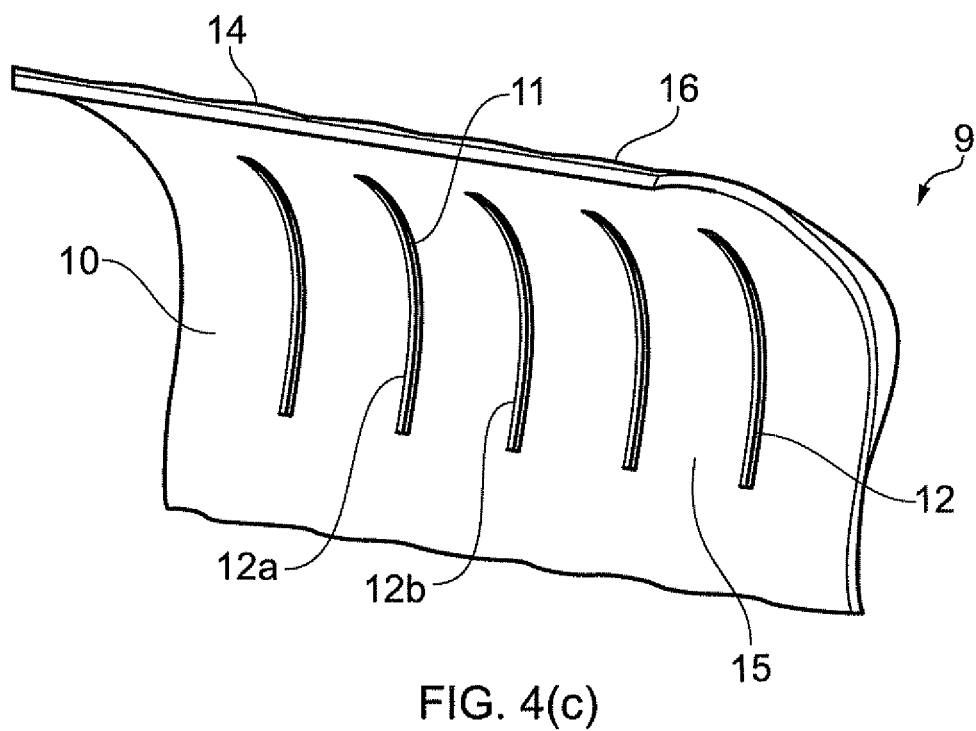

FIG. 3 shows a longitudinal cross-sectional view through the conventional HP turbine of FIG. 2, the radially outer annular conduit 5 now being fitted with a separator device 9 according to an embodiment of the present invention. FIG. 4 shows (a) a longitudinal cross-sectional view of the device, (b) an isometric view from the rear of a portion of the device, and (c) and isometric view from the front of a portion of the device. In FIGS. 4(b) and (c), the portions of the device are shown extending linearly (i.e. straight), although each segment may be arcuate and forming one of an annular array of circumferentially segments extending around the conduit. Nonetheless it is possible that the separator device is a single annular item.

The separator device 9 is a ring-shaped structure pressed or otherwise fabricated from sheet metal that extends circumferentially around and radially across the conduit 5 between the discharge nozzles 8 and the feed opening 6 into the interior of the NGV 1.

The separator device 9 is attached to the outer wall of the conduit 5 at its radially outer edge, which is generally circular in shape, before adopting an increasingly sinusoidal curvature at progressive radial distances from the other edge. Similarly the inboard edge of the separator device is generally circular in shape where it attaches to the outer platform of the NGV segment structure, immediately downstream of the discharge nozzles 8.

Airborne large and medium sized dirt particles that are carried with the cooling air 7 in the conduit 5 are in greatest concentration towards the outer wall of the conduit 5, due to the centrifugal action of the swirling flow that originates at the exit of the HP compressor. The separator device 9 has a sinusoidal or concertina-like shape with an impingement surface 10 for the cooling air formed by a succession of generally radially extending, circumferentially spaced, ridges 11. The curved shape of the impingement surface on longitudinal cross-sections captures the dirt particles in the folds between the ridges and channels them from the outboard region of the conduit towards the discharge nozzles 8. These relatively large nozzles, compared to cooling holes of the NGV itself, reintroduce the dirt particles back into the mainstream gas path with a ballistic flow formed by a first portion 7a of the cooling air that penetrates the streamlines of the mainstream gas. The dirt particles ultimately travel around the airfoil suction surface of the NGV with the relatively cold dense cooling air, the cooling holes situated on the early suction side of the NGV airfoil being relatively unsusceptible to cooling hole blockage from dirt ingress.

A second portion 7b of relatively clean cooling air passes through a series of linear slots 12 which extend along the tops of the ridges 11 at the inboard side of the separator device 9 to supply the NGV 1 cooling scheme via feed opening 6. The slots are sized such that they do not substantially reduce the feed pressure of the cooling air. By terminating the slots at about the radial midpoint of the conduit 5, the larger dirt particles, which are in greatest concentration towards the outer conduit wall have little opportunity to pass through the slots.

By filtering the coarser dirt particles from the second portion 7b of cooling air, the incidence of internal blockage of NGV airfoil cooling holes can be reduced. This allows smaller diameter cooling holes to be adopted, enabling more efficient cooling configurations, and allows a greater proportion of cooling air to be sourced from the radially outer bypass conduit 5.

To optimise the performance of the separator device 9, the number and height of ridges 11 (i.e. the frequency and amplitude of the sinusoidal curvature shape) can be changed. Also the locations, sizes and shapes of the slots 12 can be modified to further optimise performance. One option is for the area of each slot to be an isosceles triangle 12a with its small angle pointed radially outwardly and with the three corners of the triangle rounded. This shape can ensure that progressively more of the flow area for the second portion of cooling air derives from radially inward locations, reducing the likelihood of impinging large particles being aligned with the slots. Other possible slot shapes are elliptical, racetrack-shaped 12b etc.

The separator device 9 defines an array of scoops having ridges 11 and troughs 15. The scoops may be either all one size or may have different dimensions, for example the troughs and ridges may have different depths and heights and/or have different spacing between ridges and/or troughs. Each scoop may have a different radial extent than its neighbour. The slots 12 are shown extending radially and between a leading edge 14 of a ridge 11 and a trough 15 of the separator device 9. Here the slots 12 extend through the wall 16 of the separator device that extends between the ridge 11 and the trough 16. As shown the slots extend from the ridge 11 at their radially outer end towards the trough 15 at their radially inner end; the slots are approximately radially aligned (parallel to a radial line) and diverge from the line of the ridge.

The separator device may comprise slots of all one configuration, as shown, or slots of a number of different shapes. This may be advantageous in preventing a separator device having slots of all one size from being blocked by one type and/or size of particulate/contaminate, such as volcanic ash.

FIG. 5 shows the results of a Computational Fluid Dynamics (CFD) analysis on movement of airborne dirt particles in cooling air flowing through a simplified geometrical configuration of the radially outer bypass conduit 5 (a) without and (b) with a separator device 9 according to the present invention installed in the conduit. Particles traces in the air flow are colour coded by particle mass.

Figure 5A:
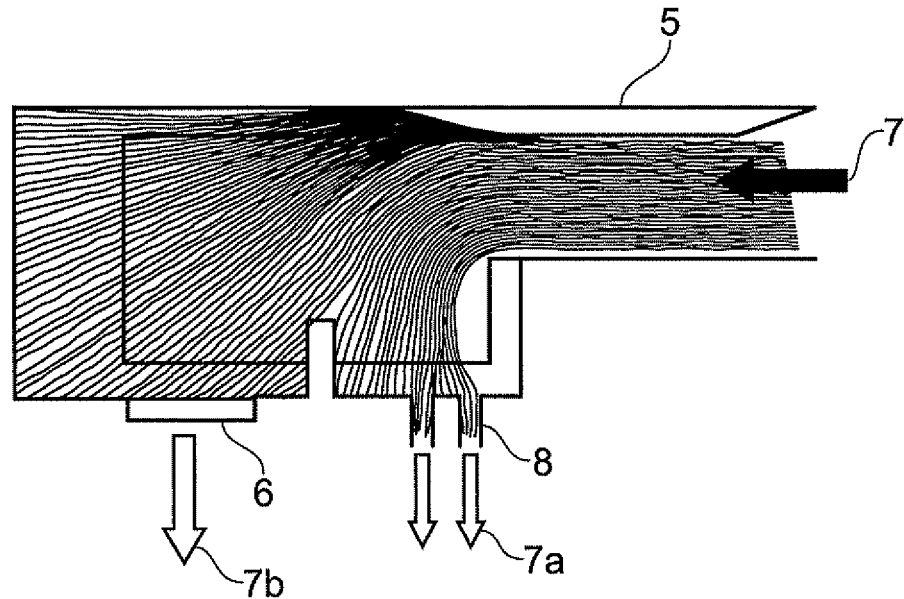
FIG. 5 shows the results of a Computational Fluid Dynamics (CFD) analysis on cooling air flowing through a simplified geometrical configuration of a conduit (a) without and (b) with a separator device according to the present invention installed in the conduit.

In FIG. 5(a), which does not have a separator device 9, mostly clean air passes through the discharge nozzles 8, as the tight bend that the flow has to negotiate to arrive at the nozzles mitigates against that portion of the flow entraining large particles. Thus the more massive particles in the air are passed to the NGV outboard feed opening 6.

Figure 5B:
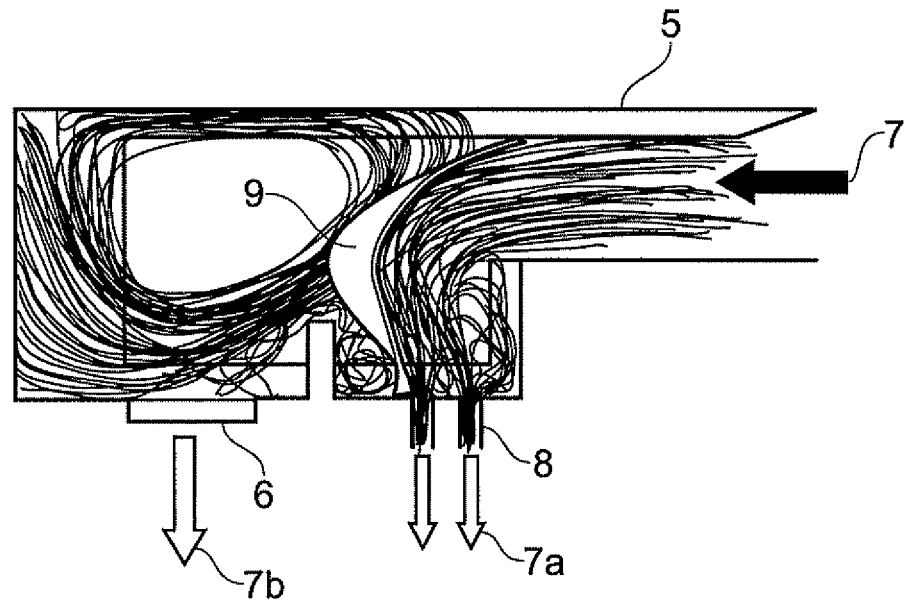

In contrast, in FIG. 5(b), which does have a separator device 9 installed in the conduit 5, the large and medium sized dirt particles mostly flow through the discharge nozzles 8, while the NGV feed opening 6 passes air in which the concentration of large and medium sized dirt particles is reduced by 80% compared with the conduit with no separator device. Advantageously, the curved shape of the separator device also helps to turn the portion of the flow that is directed towards the discharge nozzles 8. This improves the jet penetration of cooling air from the nozzles into the working gas flow.

In this CFD analysis, the concentration of dirt particles in the air at the inlet to the bypass conduit 5 was evenly distributed. However, in an actual engine the larger particles will be concentrated toward the outer wall of the conduit. The separator device 9 would likely have provided even greater reductions in concentration of large and medium sized dirt particles in the air passing through the feed opening 6 if this had been included in the analysis.

While the invention has been described in conjunction with the exemplary embodiments described above, many equivalent modifications and variations will be apparent to those skilled in the art when given this disclosure. For example the conduit 5 may have more than one separator device 9 installed therein, the devices being e.g. arranged in series to progressively reduce the dirt concentration in the cooling air. Accordingly, the exemplary embodiments of the invention set forth above are considered to be illustrative and not limiting. Various changes to the described embodiments may be made without departing from the spirit and scope of the invention.

The invention claimed is:

1. A separator device that separates dirt particles from a flow of cooling air fed to airfoils of the turbine section of a gas turbine engine comprising:
    an array of scoops that direct a first portion of impinging cooling air flow away from openings which direct the air into the airfoils and to allow a second portion of the impinging cooling air to continue to the openings; and
    an impingement surface provided on the array of scoops, wherein the separator device has a plurality of through-holes formed on the impingement surface through which the second portion of the cooling air passes to continue to the openings,
    wherein the separator device is located in a conduit which is radially outwards of a working gas annulus,
    wherein the separator device extends, in use, across the conduit which bypasses a combustor of the engine to convey pressurized cooling air carrying dirt particles from a compressor section of the engine to the openings, and
    wherein the first portion of cooling air has a higher concentration of the coarsest dirt particles carried by the cooling air than the second portion of cooling air.

2. The separator device according to claim 1, wherein each scoop comprises ridges and a trough.

3. The separator device according to claim 1, wherein the conduit forms an annulus and the separator device is correspondingly ring-shaped to extend across the conduit and may be either annular or an annular array of circumferential segments.

4. The separator device according to claim 1, wherein the through-holes are sized to prevent or restrict the passage therethrough of the coarsest dirt particles.

5. The separator device according to claim 1, wherein the through-holes are formed as slots.

6. The separator device according to claim 5, wherein the slots extend substantially in a radial direction of the engine.

7. The separator device according to claim 1, wherein the impingement surface is shaped to direct the first portion of the cooling air flow away from the openings.

8. The separator device according to claim 7, wherein the impingement surface forms a series of generally radially extending, circumferentially spaced, ridges.

9. The separator device according to claim 2, wherein the height of each ridge increases towards the radial center of the conduit.

10. The separator device according to claim 8, wherein the through-holes are located on the tops of the ridges.

11. The separator device according to claim 1, which directs the first portion of the cooling air towards discharge nozzles which feed the first portion of the cooling air into a working gas annulus upstream of the airfoils.

12. The separator device according to claim 1, which is formed from a plurality of separator sub-portions, each sub-portion occupying a respective sector of the conduit.

13. The separator device according to claim 1, wherein the separator device is located in a conduit which is radially outwards of a working gas annulus of the gas turbine engine with respect to the central axis of the gas turbine engine.

14. A gas turbine engine comprising the separator device according to claim 1.

* * * * *